(12) United States Patent
Moritani

(10) Patent No.: US 7,847,008 B2
(45) Date of Patent: Dec. 7, 2010

(54) HYDROGENATED NBR COMPOSITION

(75) Inventor: Yoichi Moritani, Kanagawa (JP)

(73) Assignee: NOK Corporation, Tokyo (JP)

( * ) Notice: Subject to any disclaimer, the term of this patent is extended or adjusted under 35 U.S.C. 154(b) by 305 days.

(21) Appl. No.: 12/102,228

(22) Filed: Apr. 14, 2008

(65) Prior Publication Data

US 2009/0258980 A1 Oct. 15, 2009

(51) Int. Cl.
*C08K 3/04* (2006.01)
*C08L 9/02* (2006.01)

(52) U.S. Cl. .................. 524/495; 524/261; 524/284; 524/566; 525/234; 525/263

(58) Field of Classification Search .......... 524/284, 524/495, 566; 525/234
See application file for complete search history.

(56) References Cited

U.S. PATENT DOCUMENTS

| | | | | |
|---|---|---|---|---|
| 4,560,729 A | * | 12/1985 | Watanabe et al. | 525/233 |
| 4,654,404 A | * | 3/1987 | Watanabe et al. | 525/315 |
| 5,051,480 A | * | 9/1991 | Coran | 525/227 |

FOREIGN PATENT DOCUMENTS

| | | |
|---|---|---|
| JP | 2000-212333 | 8/2000 |
| JP | 2001-288303 | 10/2001 |
| WO | WO 2007/094158 | 8/2007 |

* cited by examiner

*Primary Examiner*—Tae H Yoon
(74) *Attorney, Agent, or Firm*—Brinks Hofer Gilson & Lione

(57) ABSTRACT

A hydrogenated NBR composition, which comprises 100 parts by weight of a blend of a hydrogenated NBR having an acrylonitrile content of 25-44% by weight and an iodine number of 32-65, with such an amount of an NBR as to make the iodine number of the blend of 40-160, 2-23 parts by weight of an ester-based plasticizer, and 0.5-10 parts by weight of an organic peroxide, preferably which further contains 0.5-10 parts by weight of a polyfunctional, unsaturated compound, has a distinguished cost performance because of blending an expensive hydrogenated NBR with a cheap NBR, can give cross-linked products having a distinguished oil resistance (resistance to such oil as No. 3 oil and other general-purpose, commercially available engine oil, etc.) and a distinguished fuel oil resistance (resistance to such fuel oil as fuel oil C, and other general-purpose, commercially available gasoline, etc.) and thus can serve as suitable molding materials for intake manifold gaskets of automobile engine or automobile sealing parts, particularly sealing parts around engines and transmission systems.

11 Claims, No Drawings

HYDROGENATED NBR COMPOSITION

TECHNICAL FIELD

The present invention relates to a hydrogenated NBR composition, and more particularly to a hydrogenated NBR composition for use as suitable molding materials for automobile engine parts such as intake manifold gaskets, etc.

BACKGROUND ART

Only hydrogenated NBR having an iodine number of 28 or less has been so far used for fear of heat resistance problem, etc., where the heat resistance can be indeed improved, but it cannot be disregard that there is still a possibility to deteriorate the low temperature characteristics (as evaluated in terms of compression set value at low temperatures such as −30° C.). As a result, the molded products will suffer from occurrence of permanent set, when exposed to low-temperature using circumstances and oil leakage therefrom will take place, especially in the case of a sealing materials, leading to undesirable failure in product performance.

Patent Literature 1: JP-A-2001-288303

The present applicant has so far proposed a hydrogenated NBR composition capable of giving molding products, which satisfy both heat resistance and cold resistance at the same time, which comprises a hydrogenated NBR having an acrylonitrile content of 15-30% by weight, white carbon having a specific surface area of 200 m²/g or less, and an organic peroxide, and preferably further contains a polyfunctional unsaturated compound and/or carbon black. The proposed hydrogenated NBR composition could attain the expected results, but encountered such a new problem as swelling of the polymer due to the low acrylonitrile content in such use circumstances that the gaskets around engines were exposed to oils and fuel oils, resulting in use failure.

Patent Literature 2: JP-A-2000-212333

The present applicant has further proposed a hydrogenated NBR composition, which comprises 100 parts by weight of a hydrogenated NBR having an acrylonitrile content of 25-44 and an iodine number of 32-65, 2-23 parts by weight of an ester-based plasticizer, and 0.5-10 parts by weight of an organic peroxide, and preferably further contains 0.5-10 parts by weight of a polyfunctional unsaturated compound, as a hydrogenated NBR composition capable of giving molding products having distinguished oil resistance and fuel oil resistance as well as distinguished heat resistance and cold resistance, and also capable of serving as suitable molding materials for intake manifold gaskets of automobile engines.

Patent Literature 3: WO 2007/094158 A1

The proposed hydrogenated NBR can fully attain the desired object, but fails to satisfy a cost performance, because of use of expensive hydrogenated NBR as a rubber component.

DISCLOSURE OF THE INVENTION

Problem to be Solved by the Invention

The object of the present invention is to provide a hydrogenated NBR composition capable of giving molding products having distinguished oil resistance and fuel oil resistance as well as distinguished heat resistance and cold resistance, capable of serving as suitable molding materials for intake manifold gaskets of automobile engines, and also capable of satisfying a cost performance.

Means for Solving the Problem

The object of the present invention can be attained by a NBR composition, which comprises 100 parts by weight of a blend of a hydrogenated NBR having an acrylonitrile content of 25-44% by weight and an iodine number of 32-65, with such an amount of NBR as to make the iodine number of the blend of 40-160, 2-23 parts by weight of an ester-based plasticizer, 0.5-10 parts by weight of an organic peroxide, and 0.5-10 parts by weight of a polyfunctional unsaturated compound.

Effects of the Invention

The present hydrogenated NBR composition has a distinguished cost performance, because of use of a blend of an expensive hydrogenated NBR with a cheap NBR, and can give cross-linked products having a distinguished oil resistance (resistance to such oil as No. 3 oil and other general-purpose, commercially available engine oil, etc.) and a distinguished fuel oil resistance (resistance to such fuel oil as fuel oil C, and other general-purpose, commercially available gasoline, etc.) as well as distinguished heat resistance and cold resistance as required, and thus can serve as suitable molding materials for intake manifold gaskets of automobile engines or automobile sealing parts, particularly sealing parts around engines or transmission systems.

BEST MODES FOR CARRYING OUT THE INVENTION

The hydrogenated NBR for use in the present invention has an AN content of 25-44% by weight, preferably 30-40% by weight, and an iodine number of 32-65, preferably 40-60. Actually, commercially available, hydrogenated NBRs, for example, Nippon Zeon product Zetpole series 2030L (AN content : 36 wt. %, an iodine number: 57=percent hydrogenation: about 80%), or blends of the 2030L with 1020 (AN content: 44 wt. %, iodine number: 25), 2020 (AN content: 36 wt. %; iodine number 28), 2020 L (AN content: 36 wt. %; iodine number: 28), 3120 (AN content 25 wt. %, iodine number: 31), or the like, each having a percent hydrogenation of about 90%, can be used. The NBR for use in the present invention has any one of acrylonitrile (AN) contents including a medium nitrile content (AN content: 25-30 wt. %), a medium-high nitrile content (AN content: 31-35 wt. %), and a high nitrile content (AN content: 36-41 wt. %). NBRs having a medium-high nitrile content can be preferably used.

When the AN content of hydrogenated NBR is less than 25% by weight, the oil resistance and the fuel oil resistance will be deteriorated, resulting in oil leakage at elevated temperatures, whereas when the AN content is more than 44% by weight, the low temperature characteristics will be deteriorated, resulting in oil leakage at low temperatures. When the hydrogenated NBR is blended with NBR, the resulting blend will have a higher iodine number than the original iodine number of the hydrogenated NBR as used. A blend having an iodine number of 40-160, preferably 50-140, more preferably 70-110, can be used. In the case of a blend having an iodine number of less than 40, low temperature characteristics will be deteriorated and oil leakage will take place at low temperatures, whereas in the case of a blend having an iodine number of more than 160 the heat resistance will be deteriorated.

Actually, the hydrogenated NBR can be used in a proportion of 95-55% by weight, preferably 85-65% by weight, more preferably 85-75% by weight, whereas NBR in a proportion of 5-45% by weight, preferably 15-35% by weight, more preferably 15-25% by weight, though dependent on the iodine number of the hydrogenated NBR as used.

Ester-based plasticizer for use in the present invention includes, for example, dibasic carboxylic acid esters such as dibutyl phthalate, di(2-ethylhexyl) phthalate, dioctyl phthalate, di(2-ethylhexyl) adipate, di(butoxyethoxyethyl) adipate, di(2-ethylhexyl) azelate, dibutyl sebacate, di(2-ethylhexyl) sebacate, etc.; phosphoric acid esters such as tri(2-ethylhexyl) phosphate, triphenyl phosphate, cresyldiphenyl phosphate, tricresyl phosphate, etc.; or the like. Actually, the commercially available products can be used as such, for example, products of ADEKA Co., Ltd. such as RS107, RS700, RS705, P200, etc.

The ester-based plasticizer can be used in a proportion of 2-23 parts by weight, preferably 7-17 parts by weight, on the basis of 100 parts by weight of the blend of hydrogenated NBR and NBR. In case of a proportion of less than 2 parts by weight, the oil resistance and the fuel oil resistance will be deteriorated, leading to oil leakage from the cross-linked products, whereas in a proportion of more than 23 parts by weight the heat resistance will be deteriorated, though the low-temperature characteristics, oil resistance, etc. can be improved.

Hydrogenated NBR mixed with the ester-based plasticizer can be cross-linked by an organic peroxide.

Organic peroxide for use in the present invention includes, for example, t-butyl peroxide, dicumyl peroxide, t-butyl cumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexine-3,1,3-di(t-butylperoxyisopropyl)benzene, 2,5-dimethyl-2,5-di(benzoylperoxy)hexane, t-butylperoxy benzoate, t-butylperoxyisopropyl carbonate, n-butyl-4,4'-di(t-butylperoxy)valerate, etc., and can be used in a proportion of about 1 to about 10 parts by weight, preferably about 2 to about 8 parts by weight, on the basis of 100 parts by weight of the blend of hydrogenated NBR and NBR. In case of a proportion of organic peroxide of less than about 1 part by weight, the resulting vulcanization products fail to have a satisfactory cross-linking density, whereas in a proportion of more than about 10 parts by weight foaming will occur, resulting in vulcanization molding failure, or even if the vulcanization molding is possible, the rubber elasticity or elongation will be lowered.

Besides the afore-mentioned essential components, the present composition can preferably further contain a polyfunctional unsaturated compound such as triallyl (iso)cyanurate, trimethylolpropane tri(meth)acrylate, triallyl trimellitate, etc. in a proportion of about 0.5 to about 10 parts by weight, preferably about 2 to about 8 parts by weight, on the basis of 100 parts by weight of the blend of hydrogenated NBR and NBR. Addition of the polyfunctional unsaturated compound is effective for further improvement of heat resistance and compression set characteristics. In case of a proportion of more than about 10 parts by weight the rubber elasticity and elongation will be lowered.

The present composition can be used upon appropriate addition of various additives usually used in the rubber industry, for example, a reinforcing agent such as carbon black, white carbon, etc., a filler such as talc, clay, graphite, calcium silicate, etc., a processing aid such as stearic acid, palmitic acid, paraffin wax, etc., an acid acceptor such as zinc oxide, magnesium oxide, etc., an antioxidant, a plasticizer, etc. Carbon black for preferable use in the present invention includes, for example, thermal black such as HAF, FEF, SAF and SRF carbon blacks, etc., and furnace black such as MT carbon black, etc., and when these two types of carbon black are used at the same time, high elasticity can be maintained at low temperatures, and the compression set can be improved at elevated temperatures and low temperatures as well. White carbon (reinforcing silica) for use in the present invention includes dry process white carbon prepared by thermal decomposition of silicic acid halide or organosilicon compound, or by heated reduction of silica sand, followed by air oxidation of vaporized SiO, etc., and wet process white carbon prepared by thermal decomposition of sodium silicate. Commercially available white carbon products generally used in the rubber industry can be used as such.

Carbon black, when used alone, can be used in a proportion of about 20 to about 150 parts by weight, preferably about 40 to about 90 parts by weight, on the basis of 100 parts by weight of the blend of hydrogenated NBR and NBR, where the carbon black of a single grade or in a mixture of a plurality of grades, as described above, can be used. White carbon, when used alone, can be used in a proportion of about 20 to about 150 parts by weight, preferably about 30 to about 60 parts by weight, on the basis of 100 parts by weight of the blend of hydrogenated NBR and NBR. Both carbon black and white carbon can be used at the same time, where each can be used in a proportion of about 10 to about 140 parts by weight on the basis of 100 parts by weight of the blend of hydrogenated NBR and NBR, but both together must be used in a proportion of about 20 to about 150 parts by weight.

When white carbon is used alone or together with carbon black, a silane coupling can be preferably used in a proportion of about 0.1 part by weight or more, preferably about 0.5 to about 3 parts by weight, on the basis of 100 parts by weight of the blend of hydrogenated NBR and NBR. Generally, any silane coupling agent can be used without any limit, so long as it can be applied to rubber. Such a silane coupling agent includes, for example, vinyltrimethoxysilane, γ-glycidoxypropyltrimethoxysilane, γ-methacryloxypropyltrimethoxysilane, γ-aminopropyltrimethoxysilane, γ-mercaptopropyltrimethoxysilane, etc. Addition of the silane coupling agent can improve the heat resistance and cold resistance.

The present composition can be prepared by kneading through a kneading machine such as Intermix, a kneader, a Banbury mixer, etc. or open rolls and its vulcanization can be carried by heating generally at about 150° to about 200° C. for about 3 to about 60 minutes through an injection molding machine, a compression molding machine, a vulcanization press, etc. and, if necessary, secondary vulcanization can be carried out by heating at about 120° to about 200° C. for about 1 to about 24 hours.

EXAMPLES

The present invention will be described in detail below, referring to Examples.

Example 1

|  | Parts by weight |
|---|---|
| Hydrogenated NBR (Zetpole 2020, a product of Nippon Zeon Co., Ltd., AN content: 36 wt. %, iodine number: 28) | 90 |
| NBR (Nipol DN3380; a product of Nippon Zeon Co., Ltd., AN content: 33 wt. %) | 10 |
| White carbon (Ultrasil 360; a product of Degsa Co., Ltd.) | 34 |
| Silane coupling agent (G-6172; a product of Toray.Dow Corning Co., Ltd.) | 2 |
| Ester-based plasticizer (RS107, a product of ADEKA Co., Ltd., adipic acid ether ester) | 15 |
| Antioxidant (Anti CD, a product of Ouchi-Shinko Chemical Co., Ltd.) | 1.5 |

-continued

| | Parts by weight |
|---|---|
| Antioxidant (Anti MBZ, a product of Ouchi-Shinko Chemical Co., Ltd.) | 1.5 |
| Zinc white | 2 |
| Organic peroxide (Percumyl D, a product of NOF Corp.) | 6 |

The above-mentioned components were kneaded through a kneader and open rolls, and the resulting kneaded product was subjected to press vulcanization at 170° C. for 20 minutes and then to oven vulcanization (secondary vulcanization) at 160° C. for 3 hours. The resulting vulcanized sheets (150 mm×150 mm×2 mm) and P24 O-rings were subjected to determination of the following test items:

| Normal state physical properties: | according to JIS K6253 and JIS K6251 corresponding to ASTM D412 |
|---|---|
| Compression set: | according to JIS K6262 corresponding to ASTM D395 At high temperature (150° C. for 70 hours) At low temperature (−30° C. for 22 hours; values at 30 minutes after release) |
| Low-temperature characteristics: | according to ASTM D-1329 (TR-10 value) |
| Heat resistance: | Change (rate) of normal state physical properties and volume after standing in an oven at 120° C. and 150° C. for 70 hours |
| Oil resistance: | Change (rate) of normal state physical properties and volume after dipping in No. 3 oil at 120° C. for 70 hours |
| Fuel oil resistance: | Change (rate) of normal state physical properties and volume after dipping in fuel oil C at 60° C. for 70 hours |
| Product performance evaluation: | Visual observation of presence of oil leakage at low temperature (−30° C.) and high temperature (120° C.) |

Examples 2 to 4, and Comparative Example

In Example 1, the blending proportion of the blend of hydrogenated NBR with NBR (total: 100 parts by weight) was variously changed.

Results of determination in the foregoing Examples and Comparative Example are shown in the following Table, together with compositions and properties of the blends.

TABLE

| Determination Item | Ex. 1 | Ex. 2 | Ex. 3 | Ex. 4 | Comp. Ex. |
|---|---|---|---|---|---|
| [Blend] | | | | | |
| Hydrogenated NBR (parts by wt.) | 90 | 80 | 70 | 60 | 50 |
| NBR (parts by wt.) | 10 | 20 | 30 | 40 | 50 |
| AN content (% by wt.) | 35.7 | 35.4 | 35.1 | 34.8 | 34.5 |
| Iodine Value | 81 | 106 | 130 | 154 | 179 |
| [Normal state physical properties] | | | | | |
| Hardness (Duro A) | 74 | 74 | 75 | 76 | 77 |
| Tensile strength (MPa) | 21.4 | 20.7 | 19.4 | 18.2 | 18.8 |
| Elongation (%) | 170 | 160 | 150 | 140 | 140 |
| [Compression set] | | | | | |
| At high temp. (%) | 12 | 12 | 12 | 12 | 12 |
| At low temp. (%) | 36 | 38 | 41 | 43 | 46 |
| [Low-temp. characteristics] | | | | | |
| TR-10 (° C.) | −35 | −34 | −33 | −32 | −31 |
| [Heat resistance] (120° C.) | | | | | |
| Hardness change (point) | +2 | +2 | +3 | +3 | +3 |
| Tensile strength change rate (%) | +2 | +5 | +12 | +20 | +27 |
| Elongation change rate (%) | +1 | −3 | −5 | −10 | −15 |
| (150° C.) | | | | | |
| Hardness change (point) | +7 | +7 | +7 | +7 | +9 |
| Tensile strength change rate (%) | +6 | +12 | +22 | +45 | +58 |
| Elongation change rate (%) | −2 | −5 | −6 | −9 | −11 |
| [Oil resistance] | | | | | |
| Hardness change (point) | −3 | −2 | −2 | −2 | −1 |
| Tensile strength change rate (%) | +2 | +2 | +3 | +3 | +4 |
| Elongation change rate (%) | −5 | −4 | −2 | −1 | +1 |
| Volume change rate ΔV (%) | +5.1 | +5.7 | +5.5 | +5.2 | +5.5 |
| [Fuel oil resistance] | | | | | |
| Hardness change (point) | −5 | −5 | −11 | −10 | −9 |
| Tensile strength change rate (%) | −56 | −55 | −52 | −55 | −59 |
| Elongation change rate (%) | −43 | −41 | −43 | −44 | −47 |
| Volume change rate ΔV (%) | +43 | +45 | +41 | +40 | +47 |
| [Product performance evaluation] | | | | | |
| Oil leakage at high · low temperatures | none | none | none | none | yes |

The invention claimed is:

1. A hydrogenated acrylonitrile-butadiene rubber composition, which comprises 100 parts by weight of a blend of a hydrogenated acrylonitrile-butadiene rubber having an acrylonitrile content of 25-44% by weight and an iodine number of 32-65, with such an amount of an acrylonitrile-butadiene rubber as to make the iodine number of the blend of 40-160, 2-23 parts by weight of an ester-based plasticizer, and 0.5-10 parts by weight of an organic peroxide.

2. A hydrogenated acrylonitrile-butadiene rubber composition according to claim 1, wherein the blend comprises 95-55% by weight of hydrogenated acrylonitrile-butadiene rubber and 5-45% by weight of acrylonitrile-butadiene rubber.

3. A hydrogenated acrylonitrile-butadiene rubber composition according to claim 2, wherein the blend comprises 85-65% by weight of hydrogenated acrylonitrile-butadiene rubber and 15-35% by weight of acrylonitrile-butadiene rubber.

4. A hydrogenated acrylonitrile-butadiene rubber composition according to claim 3, wherein the blend comprises 85-75% by weight of hydrogenated acrylonitrile-butadiene rubber and 15-25% by weight of acrylonitrile-butadiene rubber.

5. A hydrogenated acrylonitrile-butadiene rubber composition according to claim 1, wherein the blend comprises a hydrogenated acrylonitrile-butadiene rubber having an iodine number of 32-65 with such an amount of acrylonitrile-butadiene rubber as to make the iodine number of the blend of 50-140.

6. A hydrogenated acrylonitrile-butadiene rubber composition according to claim 5, wherein the blend comprises a hydrogenated acrylonitrile-butadiene rubber having an iodine number of 32-65 with such an amount of acrylonitrile-butadiene rubber to make the iodine number of the blend of 70-110.

7. A hydrogenated acrylonitrile-butadiene rubber composition according to claim 1, wherein 20-150 parts by weight of carbon black, white carbon or both thereof is further contained.

8. A hydrogenated acrylonitrile-butadiene rubber composition according to claim 7, wherein a silane coupling agent is further contained together with the white carbon.

9. A hydrogenated acrylonitrile-butadiene rubber composition according to claim 1, for use as molding materials for intake manifold gaskets of engines.

10. An intake manifold gasket obtained by cross-linking molding of a hydrogenated acrylonitrile-butadiene rubber composition according to claim 9.

11. A hydrogenated acrylonitrile-butadiene rubber composition according to claim 1, further comprising 0.5-10 parts by weight of polyfunctional unsaturated compound.

* * * * *